(No Model.)
W. G. ATWOOD.
CORN HARVESTER.
No. 471,632. Patented Mar. 29, 1892.
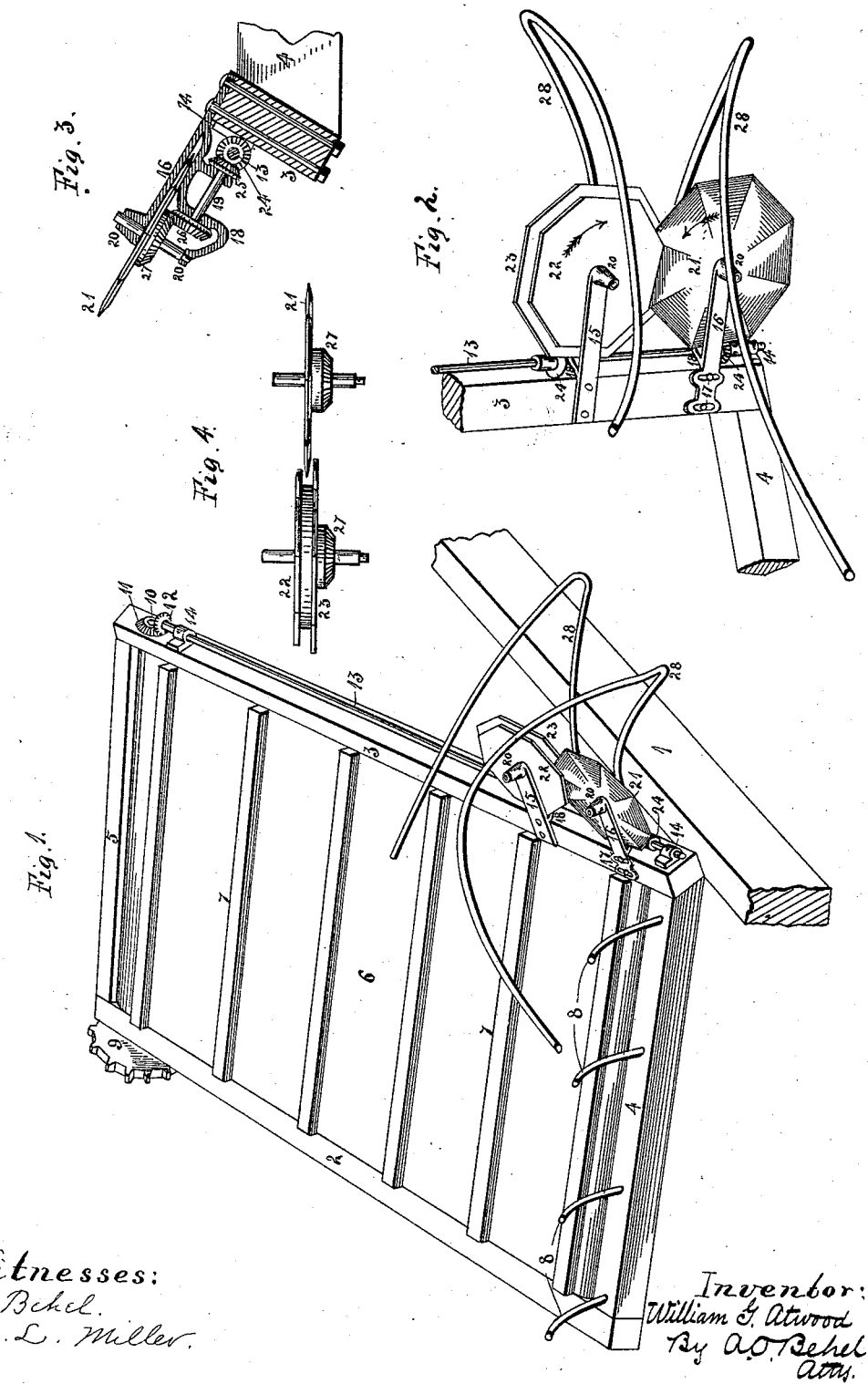
Witnesses:
E. Behel.
L. L. Miller.
Inventor:
William G. Atwood
By A. O. Behel
Atty.

UNITED STATES PATENT OFFICE.

WILLIAM G. ATWOOD, OF HARLEM, ILLINOIS.

CORN-HARVESTER.

SPECIFICATION forming part of Letters Patent No. 471,632, dated March 29, 1892.

Application filed September 19, 1891. Serial No. 406,207. (No model.)

*To all whom it may concern:*

Be it known that I, WILLIAM G. ATWOOD, a citizen of the United States, residing at Harlem, county of Winnebago, and State of Illinois, have invented certain new and useful Improvements in Corn-Harvesting Machines, of which the following is a specification.

The object of my invention is to produce a machine to cut off cornstalks standing in the field with little power and without clogging in the cutting mechanisms, whereby the stalks are pulled up by the roots.

In the accompanying drawings, Figure 1 is a perspective representation of a corn-harvesting machine embodying my invention. Fig. 2 is a plan view of the cutting mechanism of the same. Fig. 3 is a sectional view through the bracket supporting the cutting-disk, showing the arrangement of the driving-gear. Fig. 4 is an elevation of the disks comprising the cutting mechanism.

In the construction of my corn-harvesting machine I build a suitable frame-work 1, on which is secured the slanting elevator-frame composed of the side bars 2 and 3 and the end beams 4 and 5. In each end of this elevator-frame are journaled rollers, over which I place the canvas apron 6, provided with the cross-slats 7 to prevent the stalks from sliding down its incline. At the bottom of the elevator, in the upper side of the end bar 4, are set the fingers 8, the purpose of which is to retain the stalks upon the apron. The apron receives its motion from the motive power by a chain belt which passes over a sprocket-wheel 9 at the rear end of the shaft 10 at the upper end of the elevator-frame. To the forward end of this shaft 10 is keyed a miter-gear 11, which meshes with the gear 12, which latter is affixed to a shaft 13, extending down the incline of the elevator-frame parallel with and secured to the bar 3 by the bearings 14, in which it freely revolves. On the upper face of the bar 3 are bolted the brackets 15 and 16, which, on account of the inclination of that bar, stand at an oblique angle of about thirty degrees to the line of advance of the machine. The rear end of the bracket 16 is provided with slots 17, by which a lateral adjustment of the bracket is rendered possible. The bracket 15 is rigidly secured to the beam 3 by two bolts passing through its rear end. The forward ends of the brackets 15 and 16 divide into two forks, the lower one 18 of which is of such conformation as to form bearings for the shaft 19, while the outer ends 20 are provided with holes in which the journals of the cutting-disk revolve.

In the bracket 16 I journal the sharp-edged octagon cutting-disk 21 and in the bracket 15 the two square-edged octagon disks 22 and 23. These latter disks are held separated a slight distance, and in the space between them the sharp edge of the disk 21 revolves, and the disk 22 is of slightly-smaller diameter than the others, for a purpose to appear hereinafter.

On the shaft 13 is secured the gears 24, which mesh with the like gears 25 on shafts 19, journaled in the lower portion of the brackets 15 and 16. This shaft 19 also bears the gears 26, which engage the teeth of similar gears 27, secured one on the under face of each of the disks 21 and 23, and through these gears motion is imparted to the cutting mechanism, their arrangements being such that the disks will be driven to turn toward each other, as indicated by arrows in Fig. 2.

Secured to the frame-work are the gatherers 28, diverging forward to catch the stalks of corn and guide them between the front edge of the disks.

The operation of my corn-harvester is as follows: Drawing it with the length of a row of corn so that the gatherers 28 will catch the stalks, guiding them into the angle formed by the diverging sides of the disks, which latter are being rotated by their connection with the motive power, the sharp-edged disk 21, revolving between the edge of the two disks 22 and 23, cuts off the stalks with a shearing motion, and, on account of the inclination at which they stand, their cut through the stalk is inclined to the horizontal line. The edge of the lower disk 23 projects beyond that of 22, allowing the stalk to bend backward as it is being cut, thus freeing the edge of the disk 21. After being severed from the butts the stalks fall backward upon the revolving apron 8, by which they are elevated to the binding mechanism, which may be of any suitable pattern. When from wear or otherwise it becomes desirable to set the disk 21 closer to the others, I loosen the bolts in the transverse slots 17 in the brackets 16 and move the bracket bodily to the required position, securing it in place by tightening the bolts again. When the bracket is thus moved, it will be necessary to slide the gear 24 on the shaft 13 into mesh with the gear 25 on shaft 19.

The importance of the inclination of my cutting-disks will be readily understood, as it is well known how much more easily a cut can be made in such a substance as cornstalks when the knife is inclined with the direction of the grain or fiber than if a tranverse incision be attempted.

I claim as my invention—

1. A cutter comprising a frame, a polygonal disk journaled thereon and turning between the edges of two like disks, said disks arranged on a line transverse to the line of draft and inclined from the horizontal, the disks also inclined upwardly toward the front of the machine.

2. A cutter comprising a frame, a polygonal disk journaled thereon and turning between the edges of two like disks, said disks arranged on a line transverse to the line of draft and inclined from the horizontal, the disks also inclined upwardly toward the front of the machine, and means for rotating the single first-mentioned disk.

WILLIAM G. ATWOOD.

Witnesses:
A. O. BEHEL,
L. L. MILLER.